Figure 1:
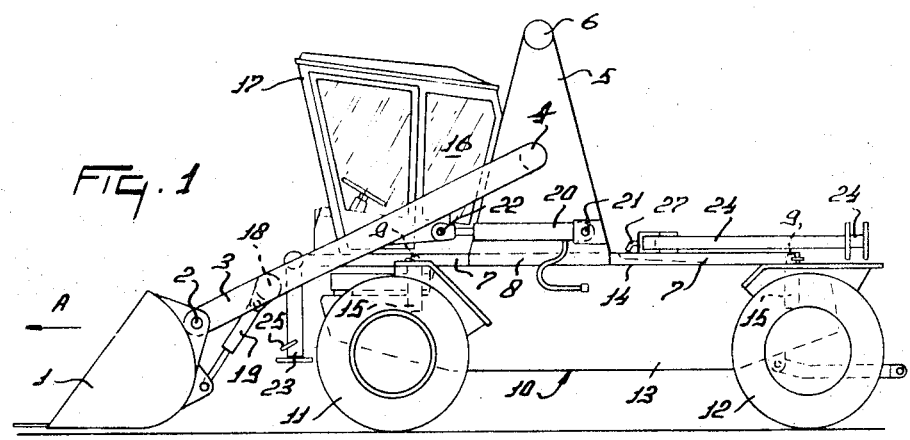

United States Patent [19]

van der Lely

[11] 3,757,976

[45] Sept. 11, 1973

[54] IMPLEMENTS

[76] Inventor: Cornelis van der Lely, 7 Bruschenrain, Zug, Switzerland

[22] Filed: Apr. 7, 1970

[21] Appl. No.: 26,291

[30] Foreign Application Priority Data
May 28, 1969 Netherlands .................. 69,08076

[52] U.S. Cl. ............................ 214/515, 296/35 A
[51] Int. Cl. .................................... B60p 1/64
[58] Field of Search .................... 214/515, 390; 296/35 A

[56] References Cited
UNITED STATES PATENTS

| | | | |
|---|---|---|---|
| 3,119,503 | 1/1964 | Herpich et al. | 214/515 X |
| 3,255,906 | 6/1966 | Proler et al. | 214/515 X |
| 3,497,092 | 2/1970 | McIntyre | 214/515 X |
| 3,501,040 | 3/1970 | Martelee | 214/515 |
| 3,501,165 | 3/1970 | Nordby | 214/515 |
| 3,520,433 | 7/1970 | Blackburn | 214/515 |
| 2,172,244 | 9/1939 | Grundler | 214/515 |
| 2,948,427 | 8/1960 | Claas | 214/515 |

*Primary Examiner*—Albert J. Makay
*Attorney*—Mason, Mason & Albright

[57] ABSTRACT

An agricultural tractor has a load supporting area to receive removable working tool and/or container attachments. The supporting area and the attachments have cooperating lifting devices and flaring parts that orient and retain the attachments during operation. Quick release elements are located on the tractor and attachments to cooperate with the lifting devices and lock the attachments in place as same are lowered on the load area. The lifting devices and quick release elements can be hydraulically operated.

11 Claims, 16 Drawing Figures

Patented Sept. 11, 1973

3,757,976

10 Sheets-Sheet 1

INVENTOR
CORNELIS VAN DER LELY
BY
Mason, Mason & Albright
Attorneys

Patented Sept. 11, 1973
3,757,976
10 Sheets-Sheet 2
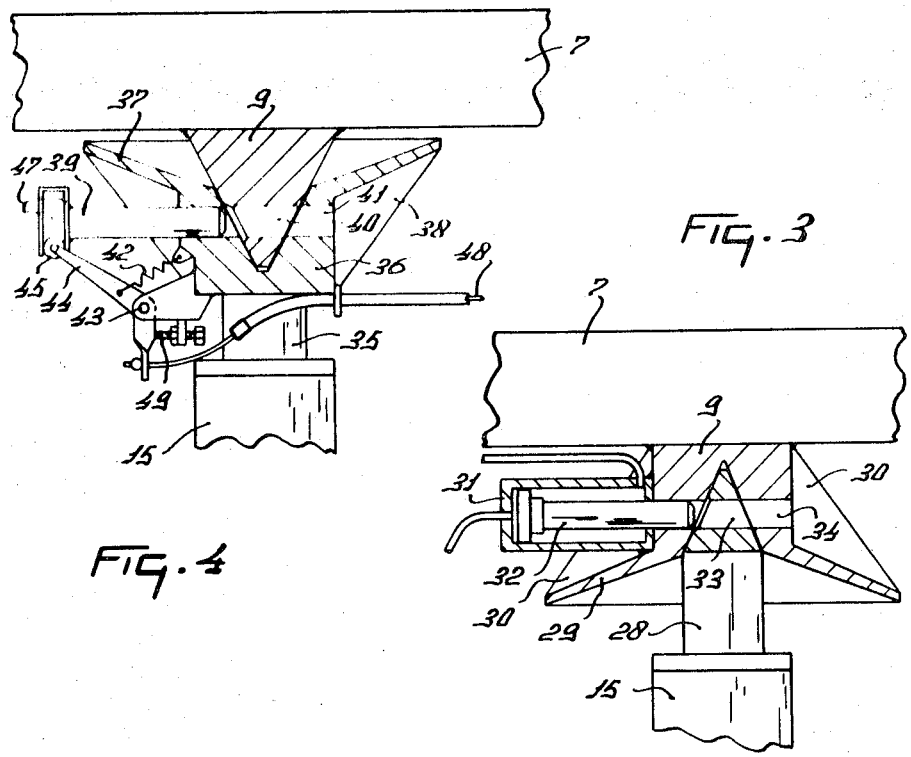
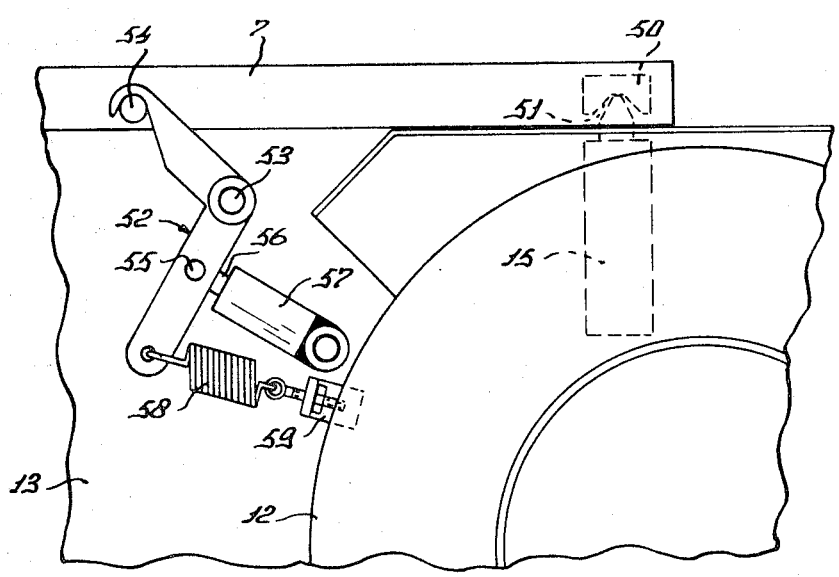
INVENTOR
CORNELIS VAN DER LELY
BY
Mason, Mason & Albright
Attorneys Patented Sept. 11, 1973

3,757,976

10 Sheets-Sheet 3

INVENTOR
CORNELIS VAN DER LELY
BY
Mason, Mason & Albright
Attorneys

Patented Sept. 11, 1973

3,757,976

10 Sheets-Sheet 6

INVENTOR
CORNELIS VAN DER LELY

Patented Sept. 11, 1973

3,757,976

10 Sheets-Sheet 9

INVENTOR
CORNELIS VAN DER LELY
BY
Mason, Mason & Albright
Attorneys

IMPLEMENTS

According to the invention the tool, the machine or the loading surface is constructed so that in the operational state it is located at least partly above the tractor, the coupling means being arranged at the lower end of the tool, the machine or the loading surface and constructed so that they can co-operate with the lifting members of the tractor which members are capable of lifting the tool, the implement or the loading surface as a whole in a direction of height.

According to a second aspect of the invention at least three coupling members are arranged, in operation, in a horizontal plane and provided with downwardly orientated openings for receiving the coupling members of the tractor.

According to a third aspect of the invention the coupling means comprise downwardly projecting conical members.

According to a fourth aspect of the invention the tool, the implement or the loading surface comprises frame portions by which the tool or the implement can be coupled completely on the top side of the tractor.

According to a fifth aspect of the invention the coupling means are fastened to at least one frame beam extending to the rear, to which frame beam the tool, the implement or the loading surface is pivotally attached.

Figure 2:
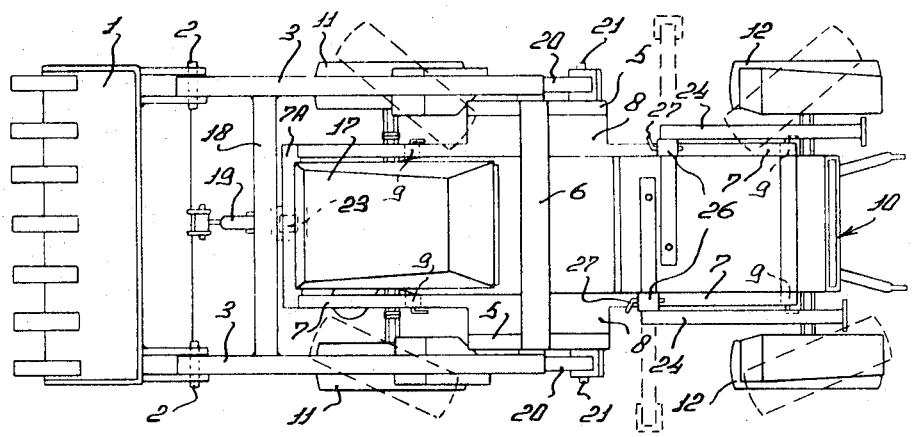
Figure 6:
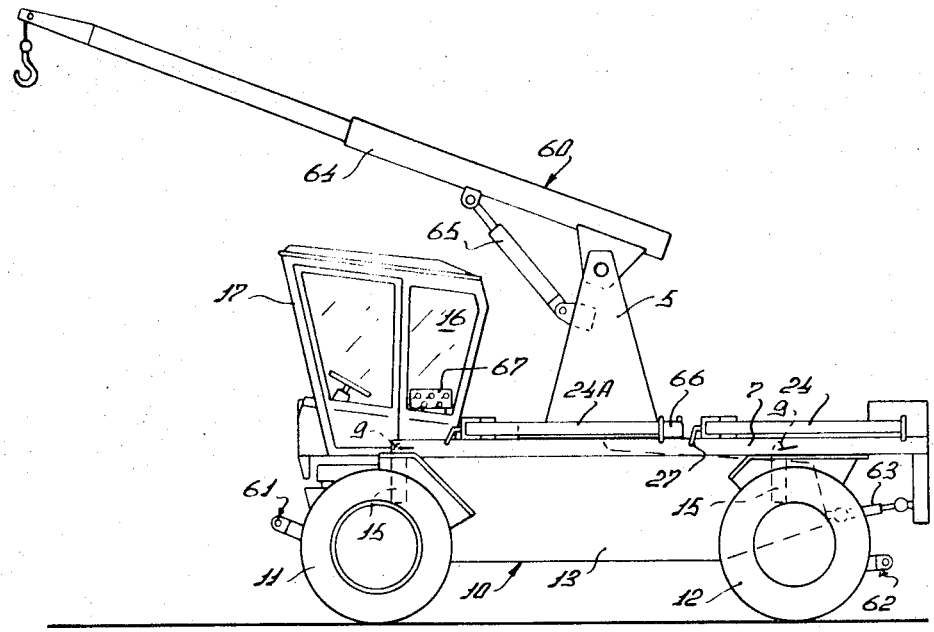
Figure 7:
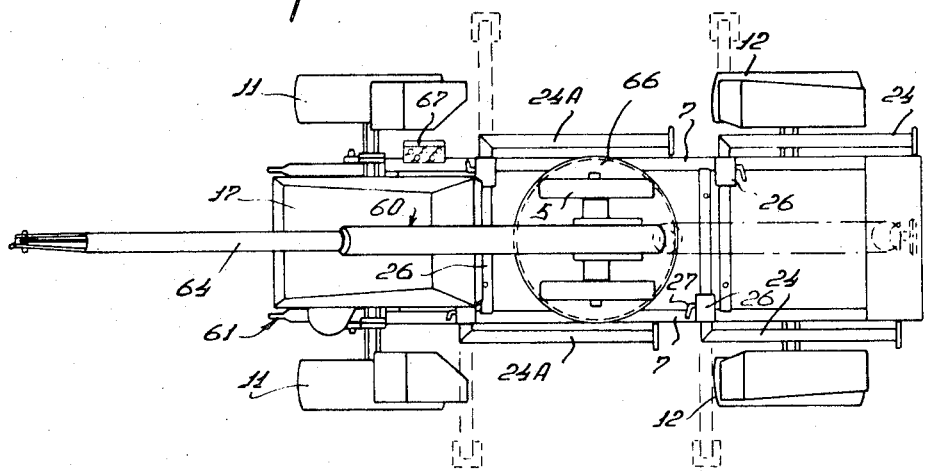
Figure 8:
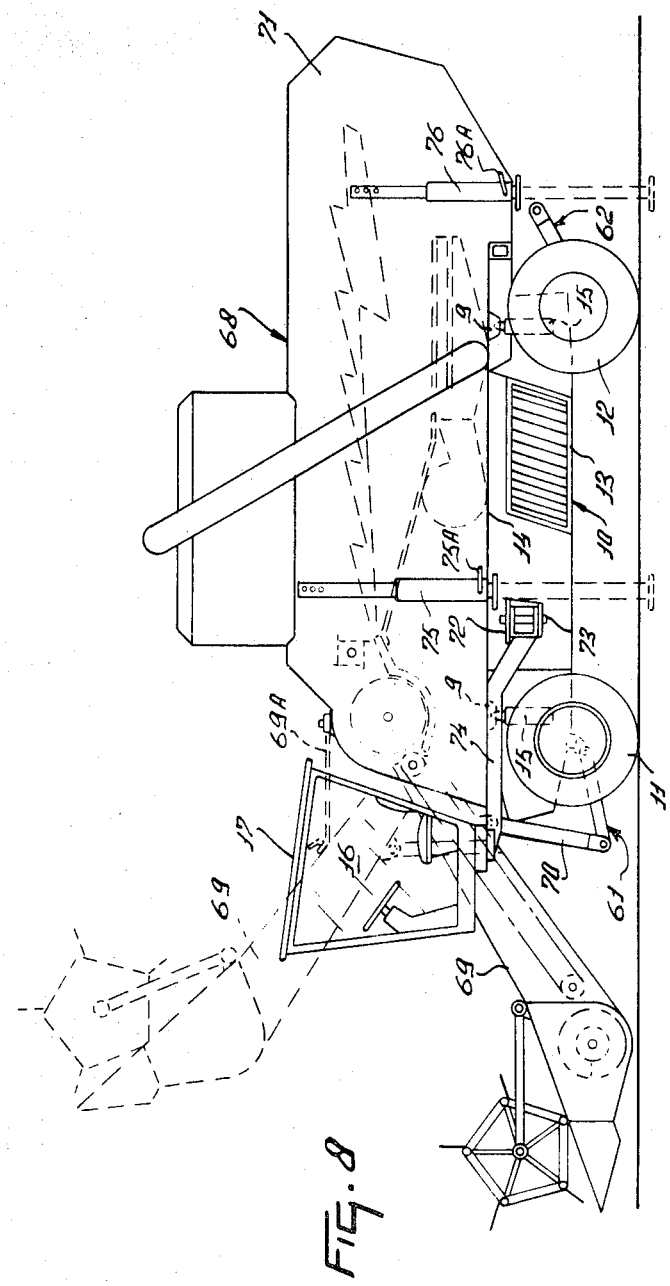
Figure 9:
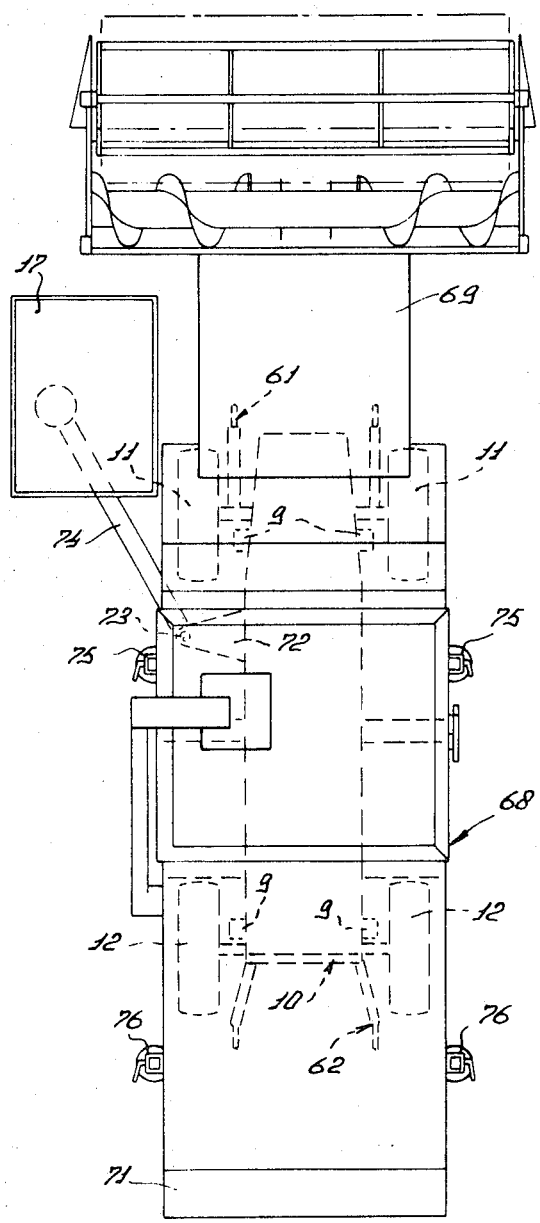
Figure 10:
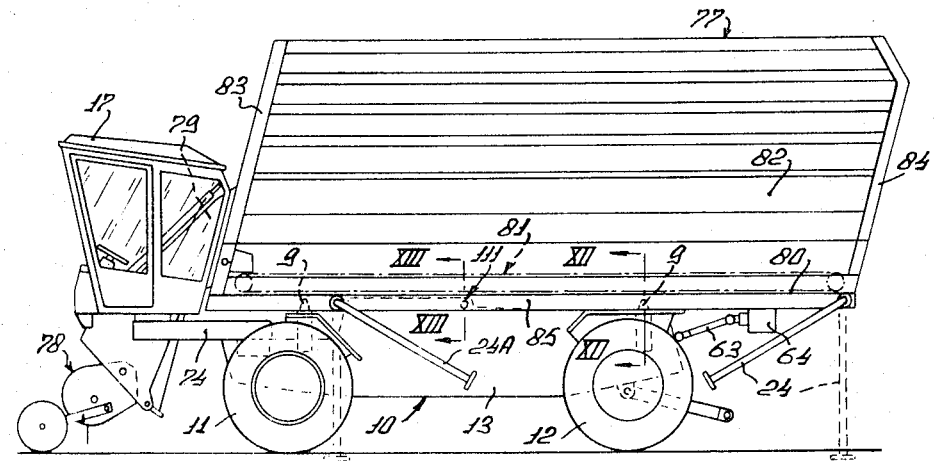
Figure 11:
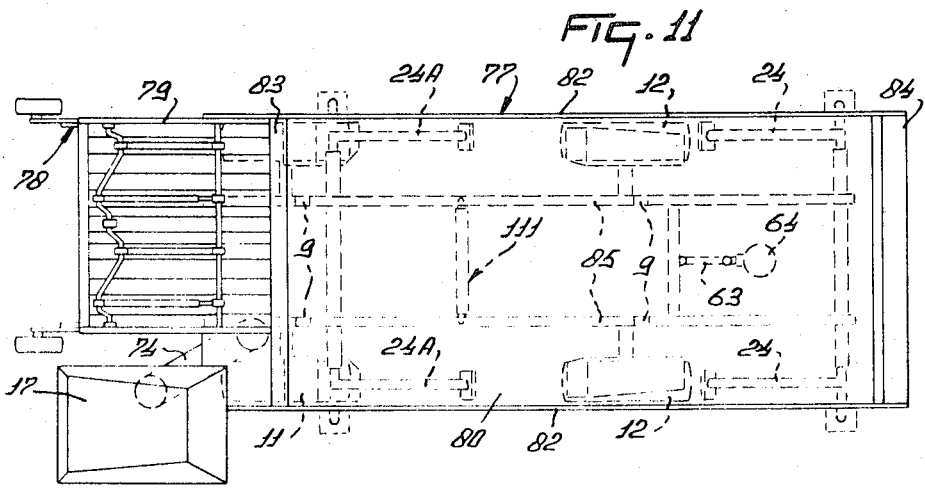
Figure 12:
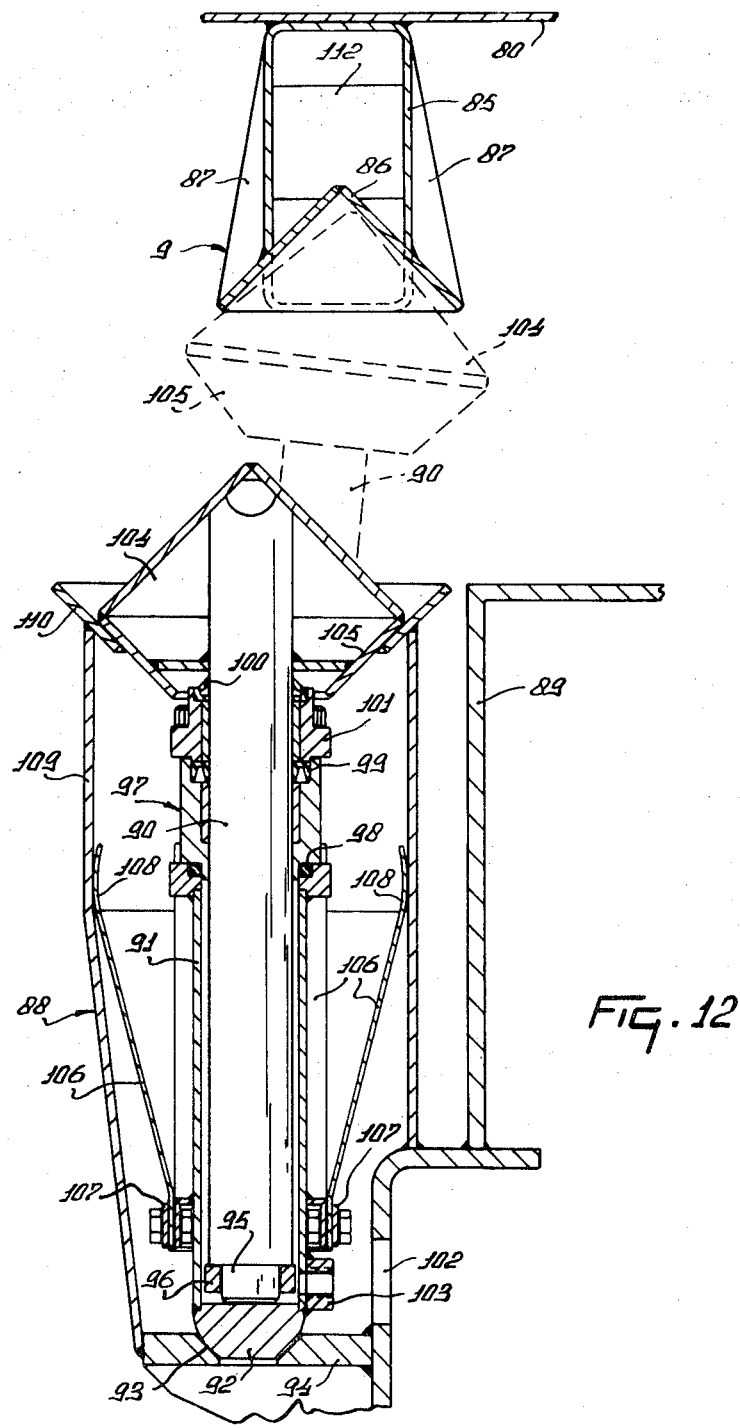
Figure 13:
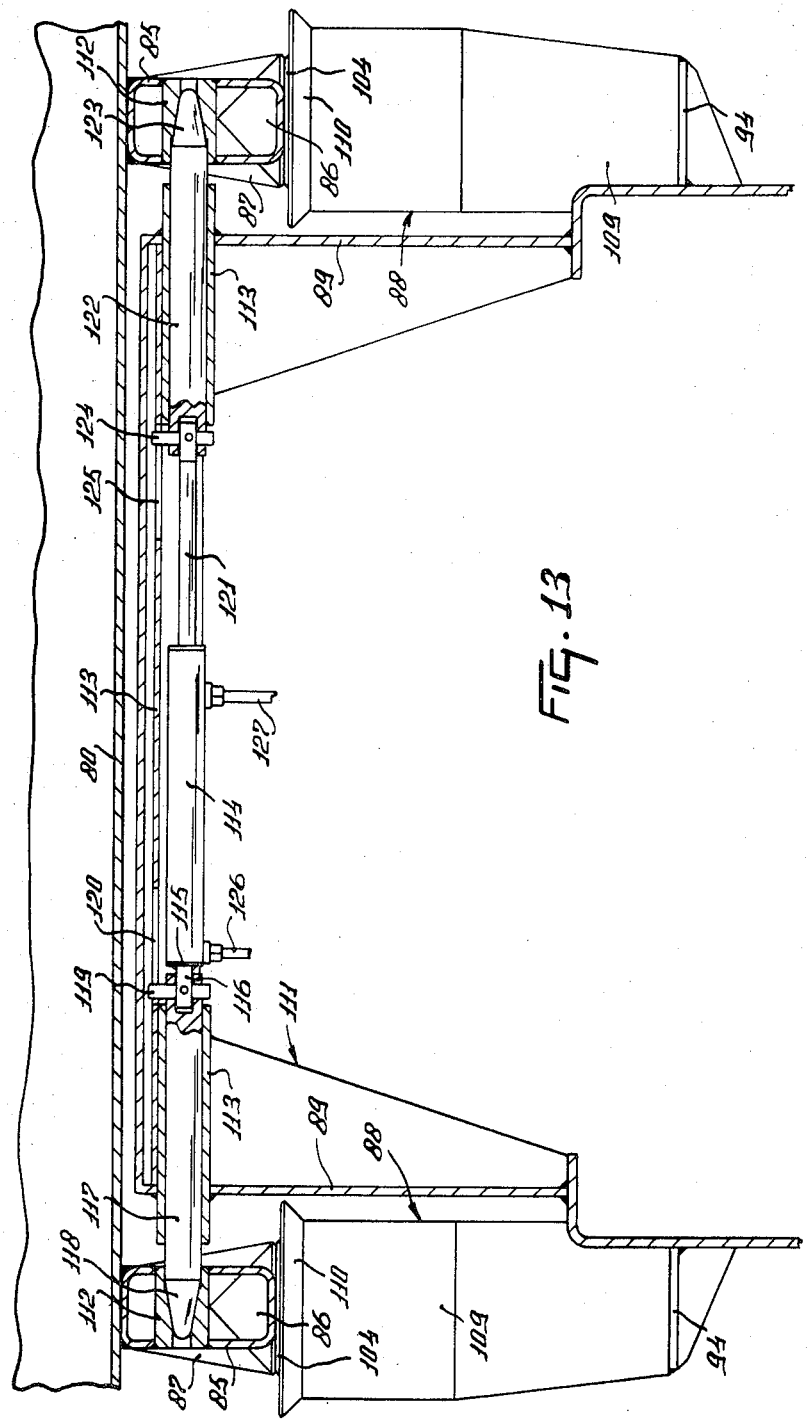
Figure 14:
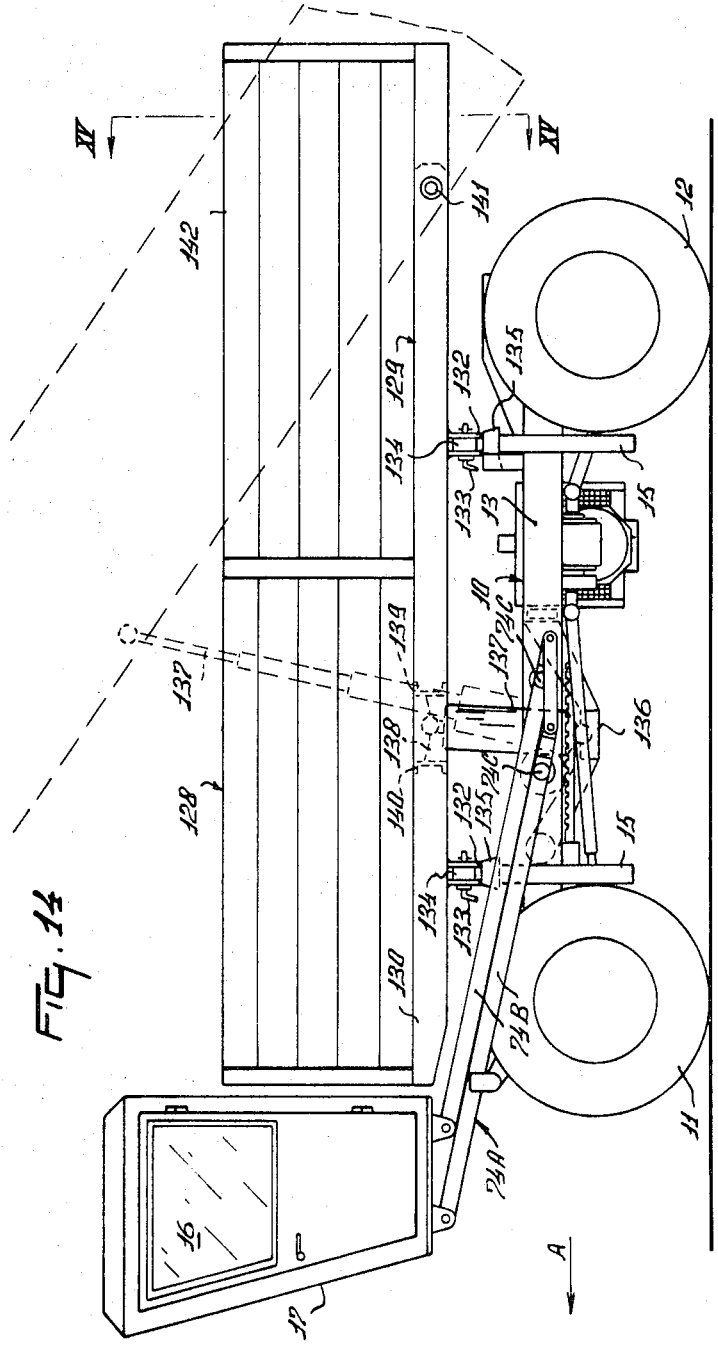
Figure 15:
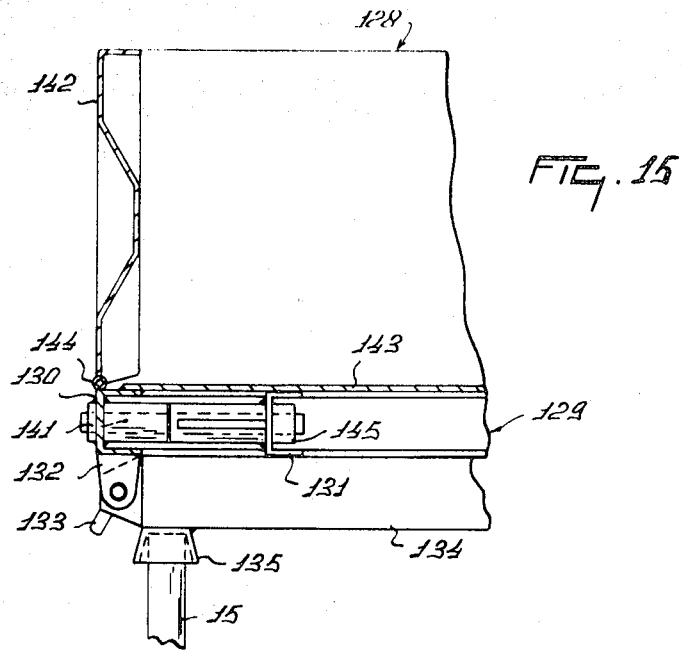
Figure 16:
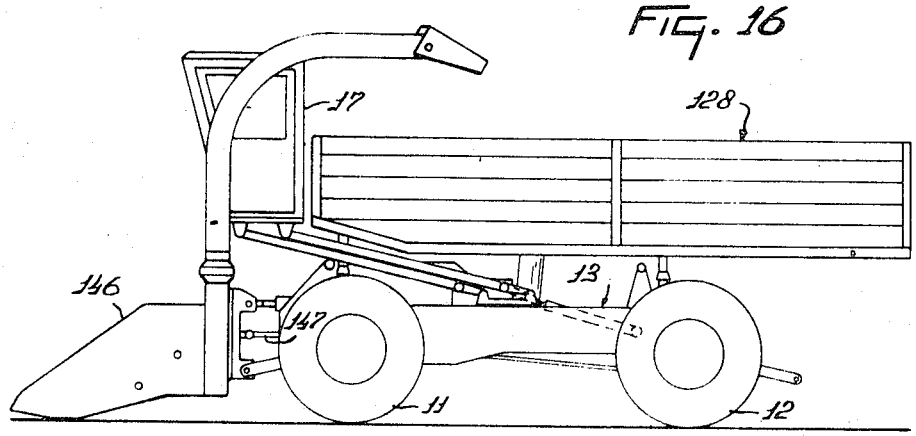

For a better understanding of the invention and to show how the same may be carried into effect, reference is made by way of example to the accompanying drawings in which:

FIG. 1 is a side elevation of a tool, an implement or a loading surface, in this case a loading shovel or excavating shovel, coupled with the top side of a tractor, FIG. 2 is a plan view of the combination of FIG. 1, FIG. 3 is an elevation and partly a sectional view of one embodiment of one of the coupling means of the tool, the implement or the loading surface and the locking system thereof adapted to co-operate with one of the lifting members of the tractor, FIG. 4 is an elevation and partially a sectional view of a second embodiment of one of the coupling members of the tool, the implement or the loading surface and the locking system thereof, adapted to co-operate with one of the lifting members of the tractor, FIG. 5 is a side elevation of a coupling member and of a locking device near the center of the tractor, FIG. 6 is a side elevation of a lifting device, in this case a hoisting crane, coupled with the top side of a tractor, FIG. 7 is a plan view of the combination of FIG. 6, FIG. 8 is a side elevation of an agricultural implement, in this case a combine harvester, coupled with the top side of a tractor, FIG. 9 is a plan view of the combination of FIG. 8, FIG. 10 is a side elevation of a loading surface coupled with the top side of a tractor, FIG. 11 is a plan view of the combination of FIG. 10, FIG. 12 is a vertical sectional view of a lifting member of the tractor of FIG. 10 combined with the sectional view of a coupling member of the loading surface taken on the line XII—XII in FIG. 10, FIG. 13 is a vertical sectional view of part of the tractor frame taken on the line XIII—XIII in FIG. 10, FIG. 14 is a side elevation of a combination of a tractor and a loading surface or loading trough, FIG. 15 is a sectional view taken on the line XV—XV in FIG. 14, and FIG. 16 is a side elevation of a combination in accordance with the invention of a tractor, a loading space and a forage harvester coupled to the front of the tractor.

The terms tool, implement or loading surface are to denote all agricultural implements, excavating implements, earth-displacing tools, lifting devices, construction implements, bulldozers, loading surfaces and loading spaces and all tools and implements for which coupling with a tractor may be essential or useful for possibilities of use, with respect to cost price, possibilities or exploitation and for driving the tool, the implement or the loading surface.

FIG. 1 shows a loading shovel or excavating shovel 1, connected with two arms 3 so as to be pivotable about a horizontal transverse pivotal shaft 2, said arms being each pivotally connected with a substantially vertical jib 5 so as to be pivotable about a horizontal, transverse pivotal shaft 4, extending transversely of the direction of movement A. The two pivotal shafts 4, each associated with one arm 3, are short shafts not extending between the jibs 5. The two substantially flat jibs 5 have identical shapes, extend parallel to each other at a distance from each other so that the two arms 3 just embrace these jibs. The jibs 5 are rigidly connected with each other on the top side by means of a connecting piece 6, which also extends horizontally and transversely of the direction of movement. The lower sides of the jibs 5 are connected with two frame beams 7 of the frame of the tool, the implement or the loading surface, said beams extending horizontally and parallel to the direction of movement A and being interconnected at the front end, viewed in the direction of movement, by a transverse beam 7A. The distance between the frame beams 7 in this embodiment is smaller than the distance between the jibs 5, which is enabled by collars 8. The frame beams 7 are provided with coupling means 9 intended for coupling the tool or the implement with a tractor 10. The tractor 10 comprises drivable, steerable front wheels 11 and drivable, steerable back wheels 12, which wheels hold a frame 13. The engine of the tractor, which preferably has a power of 100 to 300 HP is arranged in the frame 13. The tractor is provided at the front and at the rear with a two-point lifting device (not shown in FIGS. 1 and 2). As a matter of course, a three-point lifting device may be arranged both at the front and at the rear of the tractor. The tractor is equipped with a hydraulic system driven by one or more oil pumps coupled with the engine.

The tractor 10 is furthermore characterized by the provision of an upper surface 14, which is substantially flat and horizontal and which forms part of the over-all top surface of the tractor.

The tractor is furthermore provided, for example, near the front wheels or back wheels, with lifting members operating in upward direction and formed mainly by four upwardly extending hydraulic cylinders 15. The piston rods of these cylinders 15 emerge from the tops of the cylinders. The cylinders 15 are coupled in known manner with said hydraulic system of the tractor and are constructed so that the piston rods can be fixed in any desired position relative to the cylinders. The cylinders 15 are actuated in common and are constructed and disposed so that the top ends of their piston rods are always located in the same horizontal plane, when the piston rods move relatively to the cylinders or are fixed in a given position relative to the cylinders. Separate actuation of the piston rods is, however, also possible.

The tractor comprises furthermore a driver seat 16 near the front side of the tractor, viewed in the direction of movement A. The driver's place is formed by a driver seat 16 surrounded by a driver cabin 17.

The coupling members 9 provided on the lower side of the tool, the implement or the loading surface are arranged on the frame beam 7 so that they match the piston rods of the cylinders 15 associated with the lifting members of the tractor, the top ends of which rods, in the lowermost position, are located near the top side of the tractor, whereas in other positions they may project above the upper surface 14 of the tractor. The coupling members 9 and the cylinder 15 are arranged, on plan, at the corners of a rectangle. It will be obvious, that in principle not more than three coupling members and hydraulic cylinders are necessary, but it is preferred to provide four of them, because they can then be arranged pairwise on each side of the tractor, the upper surface 14 of the tractor 10 being thus left free for receiving differently shaped tools, implements or loading surfaces.

In a horizontal direction at right angles to the direction of movement A the distance between two coupling members 9 is preferably about twice the distance between two coupling members viewed in the direction of movement A.

The point of gravity of the tool, the implement or the loading surface is located, on plan, within the figure formed by the lines of connection between the coupling members 9. The coupling members 9 and the corresponding cylinders 15 are arranged on the frame 13, viewed from aside, substantially at the level of the axles of the front wheels and back wheels respectively so that the tractor frame is substantially not loaded as a whole by the tool or the implement, the forces being directly transferred to the wheel axles.

Between the arms 3 of the tool or the implement of FIGS. 1 and 2 a transverse arm 18 is pivoted to it a hydraulic cylinder 19 by means of a horizontal pivotal shaft extending transversely of the direction of movement, one end of said cylinder being pivotally coupled with the loading or excavating shovel 1 by means of a horizontal shaft. By actuating the cylinder 19 the blade of the loading or excavating shovel 1 can be turned with respect to the arms 3.

Between each jib 5 and an arm 3 a hydraulic cylinder 20 is pivotally coupled by means of horizontal transverse shafts 21 and 22 respectively, by means of which the arms 3 and hence the blade of the loading or excavating shovel 1 can be swung upwards and downwards.

The pivotal shaft 4 is arranged with respect to the frame beams 7 forming the frame of the tool, the implement or loading surface so that it is located near and behind the front wheels of the tractor and also above the top surface 14 of the tractor. Thus the arms 3 are comparatively long and with the same stroke of the cylinders 20 the blade of the loading shovel 1 can be displaced over a great height, which may be important, for example, for loading silos. The comparatively high position of the pivotal shaft 4 contributes thereto.

The hydraulic system of the tool or the implement by which the hydraulic cylinders 19 and 20 can be actuated is constructed so that it can be coupled with the hydraulic system of the tractor.

The frame of the tool or the implement, in this case the frame beams 7, is provided with means for supporting the tool or the implement from the ground, when it is out of operation.

The frame beams 7 are provided for this purpose with supports 23 and 24, located near the front side and behind the jibs 5 respectively. By these supports the tool or the implement can be held on the ground, when it is discoupled from the tractor and is put down separately out of operation.

The support 23 is formed by an external tube vertically secured to the center of the transverse beam 7A, in which an inner tube is axially displaceable and fixable by a locking pin 25 in the external tube both in the inserted position and in a plurality of outer positions. On the top sides of the frame beams 7 horizontal, hollow tubes 26 of circular section extend transversely of the direction of movement A, each of which tubes accommodates an inner tube, which is axially displaceable relative to the external tube 26. One end of each inner tube has secured at right angles to it a support 24. The inner tubes held in the external tubes 26 are locked by the locking pins 27 against axial relative displacement relative to the external tubes and against relative rotation.

The tool or the implement is formed so that the distance between the lower side of the connecting piece 6 and the lower side of the frame, here the frame beams 7, is larger than the distance between the top side of the tractor frame and the highest point of the tractor. Moreover, the distance between the two jibs 5 is larger than the maximum width of the parts of the tractor projecting above the top side of the tractor frame, in this case the driver cabin 17.

The coupling members 9 may each be formed by downwardly tapering parts secured to a frame beam 7, i.e., parts flaring in downward direction and matching the conical end of the corresponding piston rod 28 of a hydraulic cylinder 15, secured to the tractor (FIG. 3). The lower end of a part 9 is provided with a dished guide plate 29, stiffened by ridges 30. At the side of the part 9 a hydraulic locking cylinder 31 is connected with the hydraulic system of the tool, the implement or the loading surface, which system communicates in turn with the hydraulic system of the tractor. The piston rod of the locking cylinder 31 forms a locking pin 32, by which the piston rod 28 can be locked to the coupling member 9 by passing the locking pin 32 through the bore 33 in the piston rod 28 and the bore 34 in the coupling member 9 as soon as the conical lower end of the coupling member 9 is in intimate contact with the top end of the piston rod 28.

The coupling members 9 may furthermore be formed so that each of them comprises a conical part 9 secured to a frame beam 7 and flaring in upward direction (FIG. 4). The corresponding hydraulic cylinder 15 associated with the lifting members of the tractor is provided with a piston rod 35 having a coupling piece 36. The coupling member 9 (FIGS. 3, 4) may be conical or key-shaped, the directions of length of the keys (in these Figures at right angles to the plane of the drawing) being alternately turned through 90° with respect to the direction of length of an adjacent coupling member. Thus large faces of application are formed in a horizontal direction. The coupling member 36 is provided at the top with a conical recess fitting around the conical part 9 and with a dished guide plate 37 having ridges 38. A locking pin 39 associated with the coupling member of the tractor can be passed through bores 40 and 41 so that the tool, the implement or the loading surface is locked by means of the conical part 9 to the piston rod 35 of the tractor. The locking pin 39 is held in this embodiment by mechanical agency (not shown) in the locked state by the tensile spring 42 which extends between the coupling member 36 and a lever 44, adapted to pivot around the shaft 43. One end of the lever has rotatably secured to it a guide roller 45, which is adapted to roll between the guide plates 47 during the displacement of the locking pin 39 through the bores 40 and 41. The other end of the lever 44 has secured to it a pull rope, Bowden cable or the like, which is also coupled with other lifting members of the tractor. A stop 49 prevents the locking pin 39 from snapping out of the coupling piece 36 when the pull rope 48 is actuated. As a matter of course, a locking system by means of a hydraulic cylinder is also possible in the structure of FIG. 4.

It is, of course, possible to equip a tool, an implement or a loading surface partly with coupling members having downwardly flaring parts and partly with upwardly flaring parts.

A further method of coupling the tool, the implement or the loading surface with the tractor and to lock it in position is illustrated in FIG. 5, where the coupling members comprise supports 50 formed by external, block-shaped bodies having conical recesses 51 on the bottom side. These recesses 51 are cup-shaped and widen in downward direction. The supports 50 are arranged at such places of the frame of the tool or the implement that the piston rods of the cylinders 15 of the tractor simultaneously enter the cup-shaped recesses 51. The tool, the implement or the loading surface bears by the supports 50 on the tractor and is held by the tractor with the aid of locking hooks 52 provided on either side of the tractor. The locking hooks 52 located approximately midway between the front and back wheels of the tractor, at least one of which is provided on either side of the tractor, are each adapted to pivot about a horizontal shaft 53, journalled in the tractor frame and extending at right angles to the direction of movement A. A hook-shaped end engages, in the operational state of the tool, the implement or the loading surface, a pin 54 on the frame thereof, said pin forming a locking member and being associated with the coupling members and extending horizontally at right angles to the direction of movement A. The pin 54 is secured to the frame of the tool, the implement or the loading surface at such a place that in the operational position it is located approximately midway between the front and back wheels of the tractor. The other part of the locking hook 52 is pivotally coupled with the piston rod 56 of a hydraulic cylinder 57 by means of a horizontal shaft 55, while near the end a heavy tensile spring 58 is coupled with the locking hook 52. The other end of the spring 58 is coupled with the tractor frame by means of a console 59. The desired tension of the spring 58 can be adjusted by means of a stretching member located near the console 59. In the working position the cylinder is not energized; the locking hook 52 is held by the heavy tensile spring 58 around the pin 54 and thus exerts a force orientated in downward direction and in the embodiment of FIG. 5 also orientated forwardly on the pin 54 and hence on the tool, the implement or the loading surface. The reactive forces of this force exerted by the locking hook 52 on the pin 54 are supplied by the (preferably four) supports 50. Thus the piston rods of the cylinders 15 are urged not only in a vertical direction in the supports 50, but also any clearance in horizontal direction between the ends of the piston rods of the cylinders 15 and the supports 50 due to the horizontal component of the force of the locking hook 52 exerted on the pin 54 is obviated because the ends of the piston rods then enter the cup-shaped recesses 51 of the supports 50 in one direction. Obviously the direction of the horizontal component of the force exerted by the locking hook 52 on the pin 54 may be chosen to be orientated rearwardly, for example, by arranging the locking member of FIG. 5 in mirror fashion relative to a vertical plane going through the pin 54; by an inclined disposition of the shafts 53 a lateral component can be obtained. If the cylinders 57 provided on either side of the tractor (FIG. 5) are energized so that the shaft 55 moves to the front relatively to the tractor, the spring 58 being thus loaded more heavily, the top end of the locking hook 52 turns upwardly and rearwardly around the pivotal shaft 53 so that the pin 54 is free. The tool, the implement or the loading surface is then freely journalled by the cup-shaped supports 50 on the tractor.

With the coupling members shown in FIG. 3 the locking is obviated by withdrawing the locking pin out of the bores 33 and 34 by means of the cylinder 31. Since the cylinder 31 is actuated by the hydraulic system of the tool, the implement or the loading surface, this system has to be discoupled only after unlocking from the hydraulic system of the tractor. This is carried out by means of known hydraulic quick-releases.

Mechanical actuation of the cables or ropes 48 of the locking system of FIG. 4 results in the withdrawal of the locking pin 39 from the bores 40 and 41. The cables or ropes 48 have then to be secured in place against the action of the spring 42.

After having been unlocked in the manner described above, the tool or the implement is bearing loosely on the tractor. By energizing all hydraulic cylinders 15 the tool or the implement is lifted upwardly as a whole approximately parallel to itself and held in the lifted state at a small distance from the tractor. The hydraulic system of the tool, the implement or the loading surface is then already discoupled from the hydraulic system of the tractor.

The locking pin 25 of the support 23 is then disengaged (FIGS. 1 and 2), after which the inner tube is shifted downwardly in the external tube and then fixed by the locking pin 25 in a position in which the lower end of the inner tube is just suspended above the ground. The locking pins 27 of the hindmost supports 24 are released and the parts of the supports 24 extending at right angles to the direction of movement are drawn out of the external tubes 26 until the parts of the supports 24 initially extending in the direction of movement are located beyond the back wheels 12 of the tractor. Then the parts extending in the direction of movement are turned through about 90° in downward direction, the inner tube turning in the external tube 26 (position indicated by broken lines in FIG. 2). These tubes are refixed relatively to each other by the locking pins 27. The lower end of the then vertical parts of the supports 24, which may be telescopically extensible, are then also located just above the ground. The piston rods of the cylinders 15 of the tractor are completely drawn in so that the tool or the implement bears on the supports 23 or 24 on the ground. The tractor is driven backwards, the cabin 17 passing through the porch formed by the jibs 5 and the connecting piece 6. The tractor is then free of the tool or the implement, which is independently disposed on the supports 23 and 24. The tractor can be recoupled with the tool or the implement or with a different tool, implement or loading surface equipped with a frame bearing on supports in a similar manner by carrying out the abovementioned operations in the reverse order. It is advantageous that the fairly large, dished guide plates 29 and 37 permit of moving the piston rods of the cylinders 15 rapidly to the correct place relative to the coupling members 9 without the need for frequent manoeuvering of the tractor. The guide plates 29 and 37 then serve as "finders."

It is thus possible to fasten different tools, implements or loading surfaces to the same tractor without the need for using predetermined combinations of tools and tractors so that considerable saving is obtained; the tractor can thus be used universally.

FIGS. 6 and 7 show the combination of a tractor with a lifting device, in this case a hoisting crane 60. Corresponding parts are designated by the same reference numerals. The tractor 10 is provided in this embodiment with a two-point lifting device at the front 61 and a two-point lifting device at the rear 62 and moreover with a power take-off shaft 63, projecting to the rear and driven by the engine of the tractor, said shaft being driven in two directions. The hoisting arm 64 is pivotally coupled with the jibs 5 by means of a horizontal shaft and can be actuated by means of a hydraulic cylinder 65. The jibs 5 are secured to a circular platform 66, which is pivotally connected with the frame beams 7 so that it can rotate through 360°. The platform 66 is provided at its circumference with teeth engaged by a gear wheel which can be driven by the power take-off shaft 63 of the tractor. The power take-off shaft 63 can be coupled to this end near the rear end of the frame beams 7 with a driving mechanism for the platform 66. This known drive of the platform 66 is not shown in FIGS. 6 and 7 for the sake of clarity. The frame beams 7 are provided with coupling members 9, which may be of the construction described with reference to FIGS. 3 and/or 4. The hydraulic system of the hoisting device can be coupled with the hydraulic system of the tractor. The control-panel 67 of the hydraulic system of the hoisting device 60 is disposed on the frame of the hoisting device so that it is located at the side of the driver cabin 17, when the hoisting device is coupled with the tractor. Thus the driver can handle the control-panel 67 from the cabin 17.

In contrast to FIGS. 1 and 2 the supports 24 and 24A of FIGS. 6 and 7 are secured to the frame beams 7 so that on plan they are located at the corners of a rectangle, when they are in the extended and tilted-down positions. The supports 24A are constructed in the same manner as the supports 24 of FIGS. 1, 2, 6 and 7. This disposition guarantees a stable position of the discoupled implement on the ground. When the tractor is discoupled in the manner described above from the hoisting device, the tractor of FIGS. 6 and 7 is driven in forward direction from beneath the tool.

FIGS. 8 and 9 show an embodiment in which at least the whole top side 14 of the tractor is occupied by the tool or the implement. The whole top side of the tractor is to be understood to mean the surface formed, on plan, by the rectangle surrounding at least the tractor wheels. FIGS. 8 and 9 show an agricultural implement, in this case a combine harvester 68, which is coupled with the top side of the tractor. The mowing and conveying portion 69 of the harvester 68, located in front of the tractor, is connected by a rod system 70 with the foremost two-point lift 61 of the tractor. The threshing part 71 of the harvester 68 joins, viewed from aside, the substantially flat upper surface 14 of the frame 13 of the tractor 10 and bears in the manner described above on the piston rods of the cylinders 15 by means of coupling members and locking members of the kind shown in FIGS. 3 and/or 4.

It is possible for the combine harvester 68 to occupy the whole surface of the tractor by the displaceability of the driver seat 16, surrounded by the cabin 17, with respect to the tool or the implement and with respect to the tractor. To this end the frame 13 of the tractor is provided with a console 72; a vertical pivotal shaft 73 is journalled in one end of the console 72 and holds one end of an arm 74. The other end of the arm 74 holds the driver cabin 17, which is pivotable about a vertical pivotal shaft beneath the cabin with respect to the arm 74. The arm 74 is pivotable with respect to the tractor and the cabin 17 is pivotable with respect to the arm 74 by means of pivotal mechanisms (not shown) provided in the tractor frame and in the hollow arm 74 respectively and driven by the hydraulic system of the tractor.

The combine harvester 68 is furthermore provided with extensible supports 75 and 76 on either side of the harvester, each support being formed by an external tube fastened to the harvester and an inner tube adapted to slide vertically with respect to the external tube and to be fixed in a plurality of positions relative to the external tube by means of locking pins 75A and 76A respectively.

The mowing and conveying portion 69 is pivotally connected with the front of the threshing portion 71 by means of a horizontal shaft extending transversely of the direction of movement.

For removing the combine harvester from the tractor the mowing and conveying portion 69 is pivoted upwardly by means of the foremost two-point lift 61 to an extent such that its lower point is at a higher level than the upper side of the driver cabin 17, after which it is fastened to the top side of the threshing portion 71 by means of a fixing member 69A.

The combine harvester is then displaced upwardly as a whole by means of the piston rods of the cylinders 15; then the inner tubes of the supports 75 and 76 are extended to just above the ground and fixed in position relative to the external tubes. By lowering subsequently the piston rods of the cylinders 15 the combine harvester is free of the tractor and bears on the ground. Then the tractor can be driven from beneath the combine harvester 68.

FIGS. 10 and 11 show a side elevation and a plan view of a tractor comprising a pivotable driver place or cabin 17. The cabin is shown in a pivoted position (FIG. 11), so that the whole length and width of the frame 13 of the tractor is available for being occupied by a loading space 77 (FIG. 10). This loading space is provided at the front with a pick-up 78 for lifting crop lying on the field and with a feeder 79 arranged between the pick-up 78 and the loading space 77, for feeding the lifted crop into the loading space 77. The loading space comprises a closed bottom 80. A rolling floor 81 is arranged above said bottom 80 (shown schematically in FIG. 10). The rolling floor 81 is driven by the power take-off shaft 63 of the tractor, which shaft is readily detachably coupled with a transmission 64 arranged beneath the bottom 80 of the loading space 77. The details of the drive of the rolling floor are not shown in FIG. 10. The loading space 77 has sidewalls 82, a front wall 83 and a rear wall 84, which is wholly or partly detachable. When the loading space 77 filled with crop has to be emptied, the rear wall 84 is removed wholly or partly and the crop is removed by actuating the rolling floor 81 with the aid of the power take-off shaft 63 of the tractor.

The loading surface formed in this case by the rolling floor 81 is supported from the frame beams 85. The frame beams 85 have extensible supports 24 and 24A, which are adapted to be tilted down. The operation of these supports is similar to that described with reference to FIGS. 6 and 7.

The coupling members 9 of the loading surface in conjunction with the lifting members of the tractor are shown in FIG. 12.

The closed bottom 80 beneath the rolling floor 81 forming the loading surface is secured to the upper side of the frame beams 85. At the place of the coupling members 9 part of the bottom side of the frame beam 85 is removed and provided with a downwardly tapering supporting piece 86, the lower edge of which projects beyond the frame beam, viewed on plan, and forming a "finder." This lower edge is held by ridges 87 on the plates of the frame beam 85.

The lifting members 88 of the tractor are secured to the frame wall 89 of the frame 13 of the tractor.

A lifting member comprises a piston rod 90 in a cylinder 91. The latter is secured to a base member 92 having a rounded-off periphery fitting in a cavity 93 of the supporting plate 94. The supporting plate 94 is directly welded to the frame wall 89. The piston rod 90 has at its lower end a thinned portion 95 surrounded by a ring 96. The cylinder 91 has a prolongation at the top said prolongation 97 having various oil seals 98, 99 and 100 and an abutment ring 101. The hydraulic connecting ducts are passed through the hole 102 in the frame wall and connected to the nipple 103, which is secured to the cylinder 91.

The piston rod 90 is provided at the top with a conical guide member 104, the largest diameter of which is approximately four times the diameter of the piston rod 90. The lower edge of the conical surface of the guide member 104 joins a second conical guide member 105, which is flaring, in contrast to the first guide member 104, in upward direction and is secured near the lower end to the piston rod 90.

Near the lower side of the cylinder 91 upwardly diverging leaf springs 106 are provided. The lower ends of these leaf springs 106, four of which are secured to the cylinder 91, are held on the cylinder by rigid clamps 107. The leaf springs 106 are preferably made of spring steel and have inwardly bent-over portions 108 near their upper ends. The leaf springs 106 engage by the outer sides of the bent-over portions 108 the inner side of the cylindrical wall 109 by pre-stress, said wall forming the outer wall of the composite lifting member 88.

The leaf springs 106 have the same dimensions, the same material properties and the same shape and are arranged symmetrically around the cylinder 91 so that the cylinder 91 invariably occupies a substantially vertical position in the no-load state both in the position shown in FIG. 12 and in the position in which the piston rod 90 is urged upwardly.

The top side of the cylindrical wall 109 has an upwardly flaring rim 110 having a conical surface; the apex of the cone of said surface is equal to that of the guide member 105.

When oil is admitted via the nipple 103 beneath the piston rod 90, the latter will move upwardly, while it is held in a substantially vertical position by the leaf springs 106. The end of the stroke of the piston rod 90 is attained when the ring 96 abuts against the lower end of the prolongation 97.

When the loading space of FIGS. 10 and 11 bears on the ground by the supports 24 and 24A (position shown in broken lines), the tractor 10 is driven in the reverse beneath the loading space 77, the driver cabin 17 being displaced out of the plane of symmetry of the tractor (FIG. 11). The supports 24 and 24A are extended as is shown in broken lines in FIG. 7 so that the tractor can drive beneath and between the supports. The position in which the lifting members 88 are located approximately beneath the coupling members 9 is shown in FIG. 12. In this position oil is admitted beneath the piston rod 90 via the nipple 103 so that the piston rod 90 moves upwardly until the top of the conical surface of the guide member 104 touches the conical supporting member 86 on the lower side, however, in general out of the center of the coupling member 9 (FIG. 12). When the piston rod is further moved upwardly, the piston rod and the cylinder are caused to tilt with respect to the wall 109; the base piece 92 turns in the cavity 93. At least one of the leaf springs 106 is thus bent over towards the cylinder 91 so that the piston rod 90 and the cylinder 91 are subjected to spring pressure tending to urge both of them back into the initial positions. The deflection is restricted by the stop 101 coming into contact with the wall 109.

When in this way all lifting members 88 of the tractor are centered in the coupling members 9, the oil pressure is increased so that the supports 24 and 24A are released from the ground and the loading space bears on the lifting members 88. As soon as the supports 24 and 24A are free of the ground, the force exerted by the leaf springs 106 bent over into an asymmetrical position on the cylinder 91 tends to urge the cylinder into a substantially vertical position. When oil is allowed to flow out of the cylinder 91 after the supports 24 and 24A have been slipped in and tilted up, the piston rod 90 moves downwardly into the cylinder 91. If, for example due to an eccentric load, the piston rod 90 and the cylinder 91 remain in a tilted position on the wall 109, the piston rod and the cylinder are automatically centered because the rim 110 moves the guide member 105 into the central position. The loading space then bears on the lifting members 88 of the tractor.

In order to lock the loading space in position a locking device 111 of the kind shown in FIG. 13 is provided. This device is located approximately midway between the front wheels and back wheels of the tractor (FIG. 10).

The frame beams 85 of the loading surface 81, as shown in FIG. 13, are provided with horizontal sleeves 112, extending transversely of the direction of movement and provided on the side of the plane of symmetry of the tractor with conical recesses flaring towards said plane of symmetry.

On the inner side of the frame wall 89 of the tractor, a horizontal tube 113 extends transversely of the direction of movement. The tube 113 accommodates a hydraulic cylinder 114. One side of the cylinder 114 is closed by an end wall 115. A rod 116 is secured at right angles to said end wall. The rod 116 is provided with a long pin 117 having a conical end 118 fitting in the conical recess of one of the sleeves 112. The rod 116 has coupled with it a substantially vertical pin 119, the top end of which projects through an elongated hole 120 in the tube 113. The hydraulic piston rod 121 of the cylinder 114 is coupled by one end also with a long pin 122 having a conical end 123 also fitting in the conical recess of a sleeve 112. Near the coupling between the piston rod 121 and the pin 122 a vertical pin 124 is passed by its top end through a second elongated hole 125 of the tube 113. The cylinder 114 is provided at the lower end with a flexible oil inlet and outlet duct 126 and 127 respectively, passed through an elongated hole in the lower part of the tube 113. The cylinder 114 is displaceable to a restricted extent in the longitudinal direction of the tube 113; this movement is limited by one of the pins 119 and 124 reaching one end of the one of the elongated holes 120 and 125.

When the cylinder 114 is located at a given place in the tube 113 and when the loading space 77 bears on the lifting members 88, the piston rod 90 being centered in the lowermost position, as is described with reference to FIG. 12, the conical recesses of the sleeves 112 will correspond with the places of the pins 117 and 122. This can be achieved in a simple manner by determining the places of the coupling members 9 and of the sleeves 112 in the frame beams 85 by means of a jig.

When oil is admitted into the cylinder 114, the piston rod 121 moves outwardly until the conical end 123 comes into contact with the sleeve 112. At this instant the vertical pin comes into contact with the end of the elongated hole 125 so that the conical end 123 cannot urge one of the frame beams away from the tractor frame. When more oil is admitted, the cylinder 114 will move to the left (FIG. 13) and hence also the pin 117 secured thereto. The end 118 of said pin will enter the recess of the other sleeve 112 until the vertical pin 119 attains the end of the elongated hole 120.

A further increase in oil pressure will not cause the frame beams 85 to deflect laterally, but the force exerted by the fluid pressure will be taken over at the ends of the elongated holes 120 and 125 as an axial tractive force by the tube 113. The loading surface or loading space is thus locked to the tractor. Obviously this locking device may be used for tools or implements.

The driver need drive the tractor only approximately beneath the coupling members 9 of the tool, the implement or the loading surface. Engagement with the tractor and locking are subsequently performed in a simple manner from the driver cabin by hydraulic and mechanical agency.

The tractor shown in FIG. 14 comprises a driver seat 16 surrounded by a cabin 17 and arranged in this advantageous embodiment on a pivotable rod system 74A. This rod system forms, viewed from aside, a parallelogram of rods with shafts 74B arranged on both sides of the frame 13. The rods and shafts 74B are pivotable in the frame 13 by means of the horizontal shafts 74C, extending transversely of the direction of movement and are otherwise pivotally connected with the bottom of the cabin 17. Owing to this structure the cabin 17 is displaceable parallel to itself in a vertical plane parallel to the plane of symmetry of the tractor.

As is shown in FIG. 14 the tractor 10 holds a loading surface 128 bearing on the screw-jacks 15 and 88. The loading trough 128 comprises a supporting frame 129 having in this embodiment outer beams 130 and inner beams 131 (FIG. 15). An outer beam 130 is provided at suitable places with fastening means or ears 132, which can be fixed by means of a locking pin 133 to a beam 134. The beam 134 in this embodiment is provided with cup-shaped orientation and fastening means 135 covering completely the end portions of the rods of the hydraulic cylinders 15 and 18 respectively in the horizontal position of the loading trough so that the supporting beams 134 are satisfactorily fixed with respect to the jacks 15 and 88. The supporting beams 134, which extend tranversely of the longitudinal axis of the tractor, constitute the supporting and fastening member proper for the loading trough 128. The frame 13 of the tractor comprises furthermore a supporting member 136 having a pivotable hydraulic lifting cylinder 137, the piston rod of which is pivoted to an arm 138. This arm forms part of a supporting structure 139, 140 of the outer beam 130. Said arm is connected with two transverse beams 139 and 140 of the framework formed by the outer beams 130. In order to move the loading trough 128 into the tilted position, the pressure in the cylinder 137 is increased, which is performed from the displaceable cabin 17 by means of a control-panel 67 on the beam 130 (similar to that shown in FIG. 6). The loading trough is thus moved into the position shown in broken lines in FIG. 14 around a shaft 141 extending transversely of the longitudinal axis of the tractor (see also FIG. 15). It should be noted that before the loading trough is tilted the locking has to be released, that is to say, the pins 133 have to be removed from the ears 132 and the beams 134.

As is shown in the elevation of FIG. 15 the sidewall 142 and the floor 143 of the loading trough 128 are secured to the framework formed by the outer beams 130. Consequently a displacement of the framework around the pivotal shaft 141 results in a displacement of the sidewall and the floor 142 and 143 respectively.

It is furthermore advantageous that the sidewall 142 is fastened to the beam 130 by means of a pivot 144 so that the sidewall 142 forms a pivotable sidewall or loading flap. The pivotal shaft 141 is fastened by means of a supporting bearing 145 to the inner beams 131 of the framework 129 (see also FIG. 14). The inner beams are in turn fastened to the supporting beams 134. When the loading trough 128 is tilted backwards, the locking bolts 133 are removed from the locking device so that the loading trough 128 will lie loosely on the supporting beams 134 and by energizing the cylinder 137 the loading trough can be tilted backwards around the pivotal shaft 141; however, the inner beams 131, fastened to the supporting beams 134, remain in a horizontal position. In this advantageous embodiment the loading trough 128 can be tilted laterally. For this purpose the locking pins have to be removed on one side so that after the hydraulic cylinder 137 is energized the loading trough can tilt around the locking pins 133 which are not removed.

FIG. 16 shows an embodiment in which the tractor according to the invention is provided at the front with a forage harvester 146 and with a tiltable loading trough 128. From this Figure it will be apparent that the driving device of the forage harvester is coupled with the foremost power take-off shaft 147 of the universal tractor; the cabin 17 is located between the forage harvester 146 and the loading trough 128. The driver can control the operation of the forage harvester 146 and the tilted positions of the loading trough 128 in a suitable manner.

From these examples it will be apparent that many possibilities are offered by providing the tool, the implement or the loading surface with a frame having coupling means on its bottom side in accordance with the invention, which means are located in a horizontal plane in the working position, said means permitting of coupling rapidly the tool, the implement or the loading surface with the lifting members of a tractor and of discoupling the same by using specially designed coupling members, while it is furthermore possible to arrange various tools or implements on the top side of the same tractor. Thus a tractor can be employed very efficiently for many purposes. Particularly a combination of a tool or an implement with a tractor having a substantially flat top side and of a driver seat displaceable relative to the tool and the implement and to the tractor frame provides a possibility of attaching various very large tools or implements.

Having thus described my invention what I claim as new and desire to secure by letters patent of the United States is:

1. An agricultural tractor having a frame and a plurality of spaced apart hydraulically operated lifting members with upwardly movable means supported by said frame, a removable agricultural attachment for connection to the upper surfaces of said tractor, said attachment having coupling members including downwardly orientated openings for receiving said upwardly movable means, said coupling members being cup-shaped and comprising downwardly flaring parts adjacent said openings, whereby said attachment can be oriented in position as a whole with said lifting members, hydraulically operated quick release means on said tractor that secures said attachment to the tractor, at least one of said lifting members of said tractor comprising conical parts that taper in an upward direction to fit in with the openings of said coupling members, said quick release means being positioned adjacent said coupling members, said quick release means comprising a movable locking device that is hydraulically displaceable to interfit with said upwardly movable means and said coupling members when said lifting members and said coupling members are in full engagement with one another, said quick release means including pin means that holds the cup-shaped parts and said upwardly movable means together after said attachment is lowered and mounted in operative position on said tractor.

2. A tractor as claimed in claim 1, wherein at least three spaced apart coupling members are arranged in a horizontal plane on the bottom of said attachment in operating position.

3. A tractor as claimed in claim 1, wherein said attachment is secured at least partly above said tractor in operating position.

4. A tractor as claimed in claim 1, wherein said attachment has four coupling members and said tractor has an equal number of lifting members on said frame.

5. A tractor as claimed in claim 4, wherein said coupling members are spaced apart and located at the corners of a figurative rectangle when the tractor is viewed in plan.

6. A tractor as claimed in claim 5, wherein said lifting members are positioned within the upper surfaces of said frame.

7. A tractor as claimed in claim 1, wherein said quick release means is supported on a frame beam of said attachment.

8. A tractor as claimed in claim 1, wherein said quick release means is pivotally connected to the tractor and passes through said lifting members to lock said tractor to said attachment.

9. A tractor as claimed in claim 1, wherein support elements are mounted on the lower frame of said attachment and said support elements are positionable to support said attachment above the upper surfaces of said tractor.

10. A tractor as claimed in claim 9, wherein at least part of said support means is pivotable about an axis extending transverse to the direction of movement of the tractor.

11. A tractor as claimed in claim 10, wherein said support means is pivotable to be secured in a substantially horizontal position above the frame of said tractor.

* * * * *